April 28, 1936.   T. H. NAKKEN   2,039,182
REPRODUCING SYSTEM
Filed March 9, 1931   5 Sheets-Sheet 1
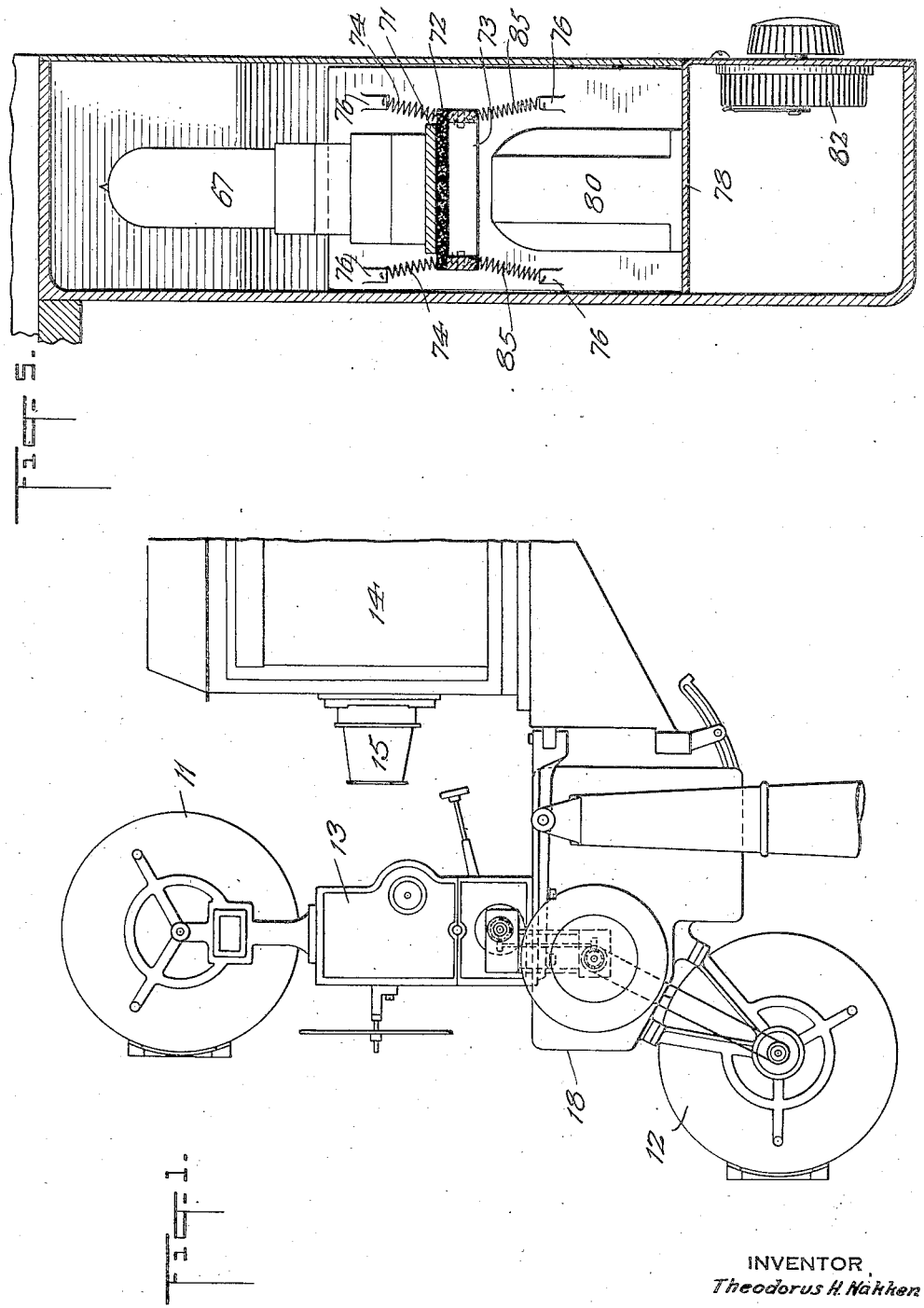
INVENTOR
Theodorus H. Nakken
BY
ATTORNEY

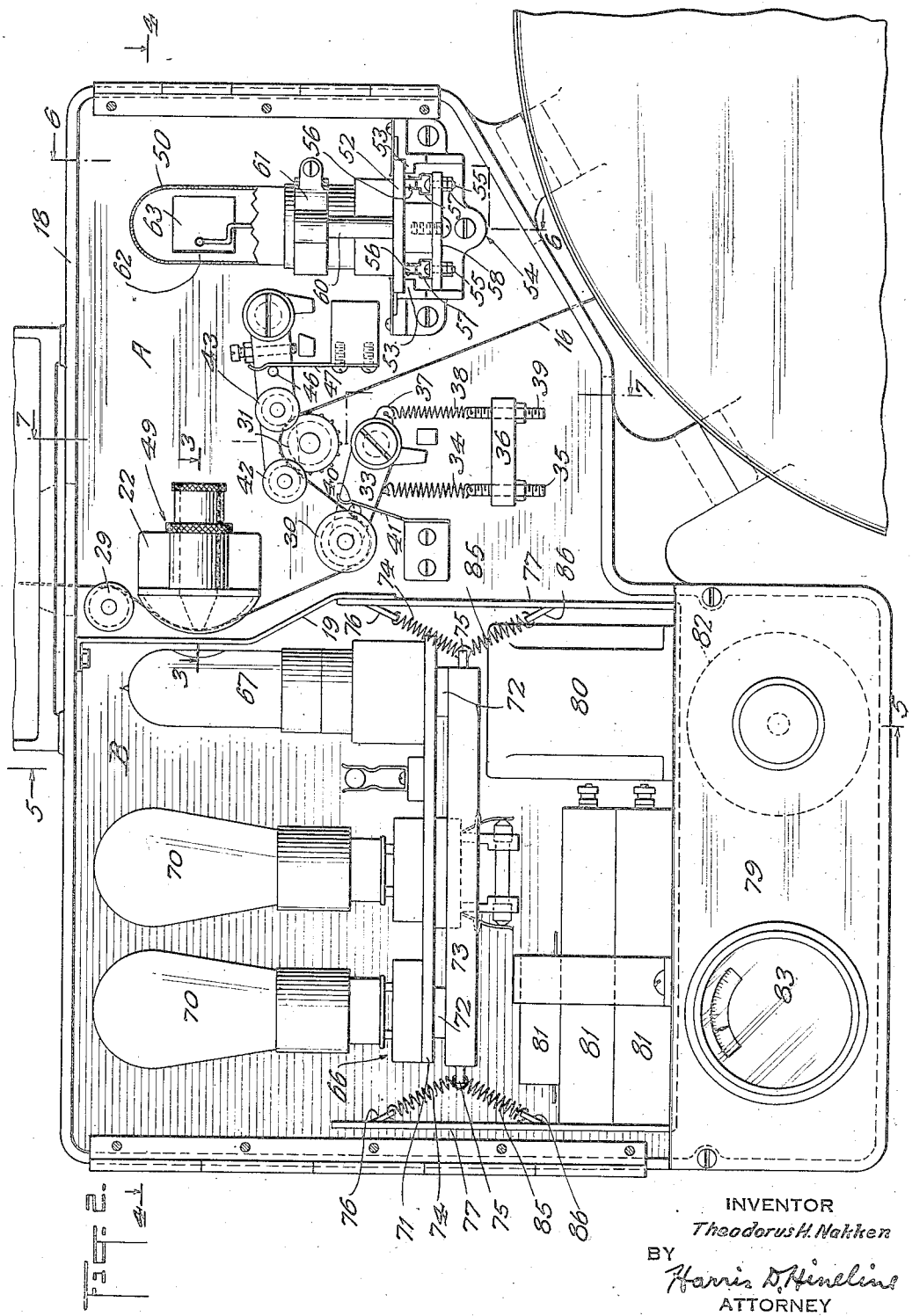

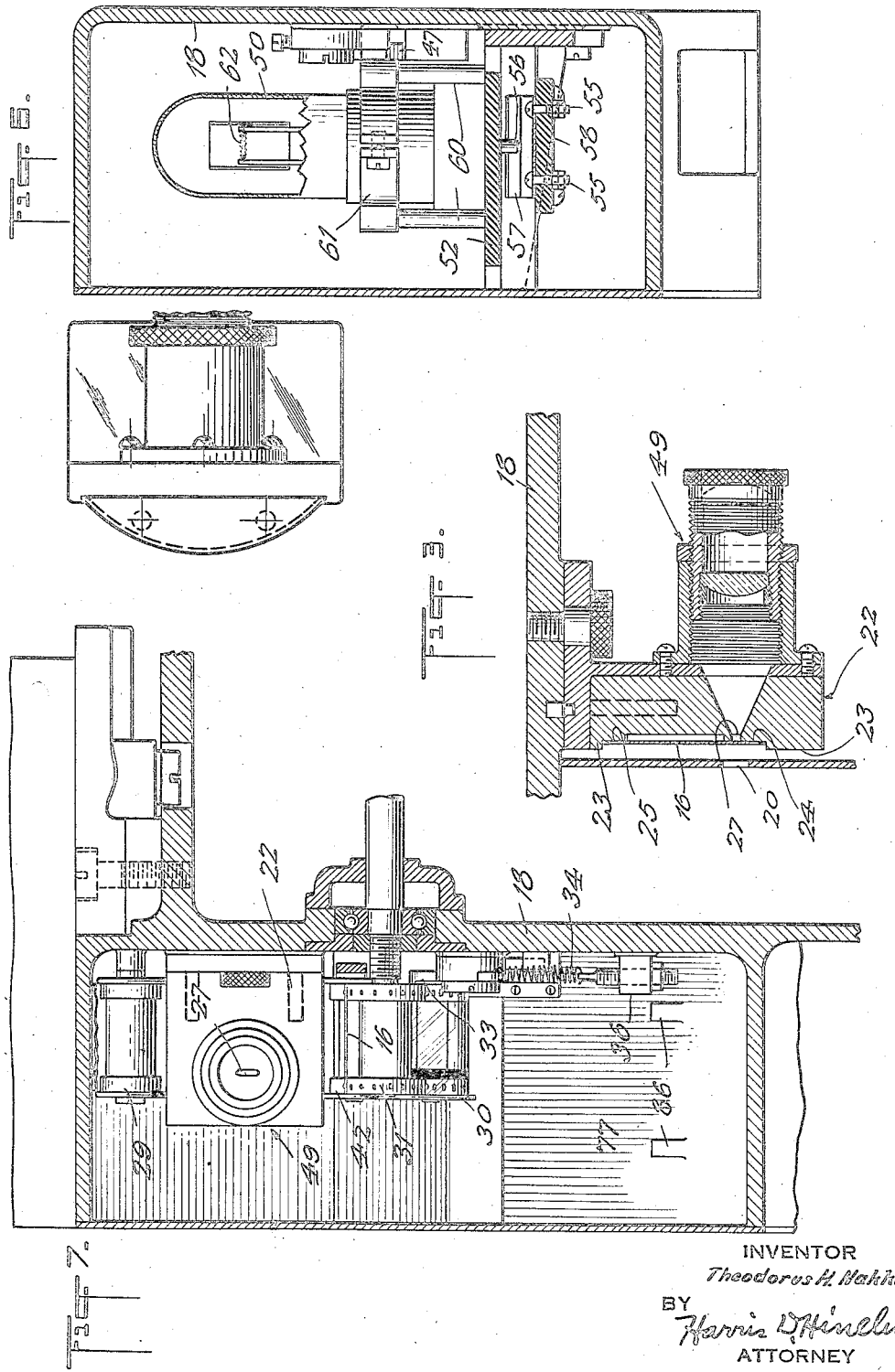

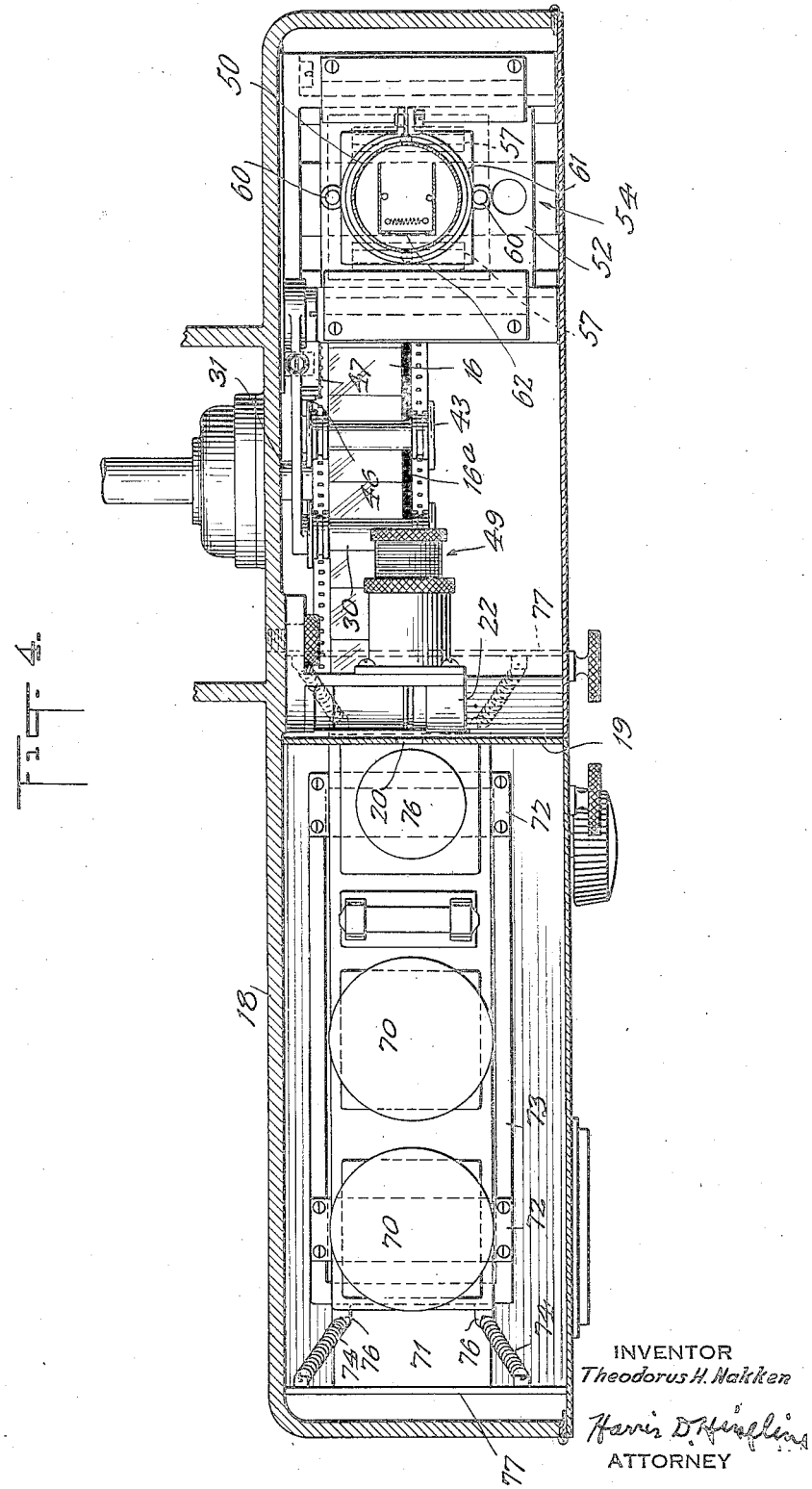

UNITED STATES PATENT OFFICE 2,039,182

REPRODUCING SYSTEM

Theodorus H. Nakken, New York, N. Y., assignor to Nakken Patents Corporation, New York, N. Y., a corporation of Delaware Application March 9, 1931, Serial No. 521,365

20 Claims. (Cl. 179—100.3)

This invention relates to motion picture apparatus of the type adapted for use in the projection of pictures accompanied with sound effects from a film which in addition to the usual pictures is provided with a sound track, and it has particular reference to improvements in film gates or guides, through or over which the film moves continuously; and to improvements in means for yieldably supporting an electrical unit including such electrical instrumentalities as a light-sensitive cell and the thermionic amplifying tubes of the type adapted to be used conjointly in reproducing sound from the sound track of a motion picture film; to improvements in means for supporting an exciter lamp of the type adapted to serve as the source of light to be focused on said sound track; to an improvement in the method of assembly of the sound head; to a simplified means for replacing the sensitive and responsive members; and to improved means for tensioning the continuously moving film.

Difficulty has been experienced in securing uniform speed of travel of film through the sound head of a reproducer utilizing photographic sound records on film; in securing ready interchangeability, adjustability and simplicity of the sensitive member in the reproducer, and in the amplifier members, and in mounting the reproducer members to avoid the influence thereon of vibration and shock.

An object of the invention is to provide an improved film guide, over which the film continuously passes, which is so constructed as to insure true sound reproduction, substantially eliminate scratching of the film, insure against interrupted travel of the film such as ordinarily results from gear and sprocket tooth flutter of the film and from buckling of the same.

To the above end the invention contemplates a curved film guide, onto and from which the film moves tangentially, and so disposed with reference to the path of the film that the latter moves in a curved or arcuate path. Preferably, the guide engages the back or non-coated side of the film. The face of the guide may be provided at its edges with shoulders which prevent lateral displacement of the film and it may also have a pair of ways which engage only the sprocket tooth margins of the film whereby the remaining or central portion of the film is free.

Another object of the invention is to provide an improved electrical unit suspension means of the character mentioned, whereby vibrations or other undue and objectionable disturbances incident to the operation of the projecting apparatus may be dampened, suppressed or so interrupted as to prevent their being transmitted to the electrical instrumentalities carried by such suspension means so as to promote fidelity of sound reproduction.

A further object of the invention is to provide an improved support for the exciter cell or tube which is so constructed as to enable the source of light to be easily adjusted, whereby such source may be properly aligned or positioned with respect to a suitable optical system associated with the film gate and located at the rear of the film gate aperture, so that the rays of light from such source may be properly focused or concentrated by the optical system upon the sound track of the film.

A further object of the invention is to provide an improved tensioning means for the continuously moving film which is so constructed that it can be delicately adjusted to exert micrometric differentiations in its tensioning influence upon the film.

The invention also contemplates the use of a platform, adapted to carry such electrical instrumentalities as a light-sensitive cell and a plurality of thermionic amplifying tubes, which is yieldably suspended at a plurality of points by tension springs and which is also yieldably anchored from below by similar means.

The invention likewise contemplates the use of a subassembly, adapted to be removed and replaced as a unit from the sound head, and to contain the photocell and the preliminary amplifier stages.

It further contemplates the inclusion in a removable sub-assembly of sockets for the photocell and amplifier tubes, and resilient supporting means therefor, and also interstage coupling members, as well as control and indicating members.

The invention further contemplates the use of a laterally adjustable support having a suitable receptacle adapted to receive an exciter lamp or tube and provided with means whereby the lamp may be secured in the desired position of adjustment.

The invention also contemplates the use of a tensioning roller carried by a pivoted arm, which cooperates with a pair of adjustable springs arranged to exert opposing influence upon such arm, whereby the resultant influence is effective as the film tensioning factor and is capable of micrometric variations in intensity.

Other objects and advantages of the invention will become apparent from the following description, taken in connection with the accompanying drawings, in which Figure 1 is a view in elevation of a motion picture projecting apparatus having in association therewith the sound head attachment embodying the various features of my invention;

Figure 2 is an enlarged view in elevation of the sound head attachment with the cover plate removed;

Figure 3 is a horizontal sectional view taken on line 3—3 of Figure 2 and showing in detail my improved film guide;

Figure 4 is a horizontal sectional view taken on line 4—4 of Figure 2;

Figure 5 is a vertical sectional view taken on line 5—5 of Figure 2 and showing a yieldable support for a light-sensitive cell and a plurality of thermionic amplifying tubes;

Figure 6 is a vertical sectional view taken on line 6—6 of Figure 2 and showing details of means for adjustably supporting an exciter lamp;

Figure 7 is a vertical sectional view taken on line 7—7 of Figure 2 and showing details of a film tensioning means and a film driving means.

Figure 8:
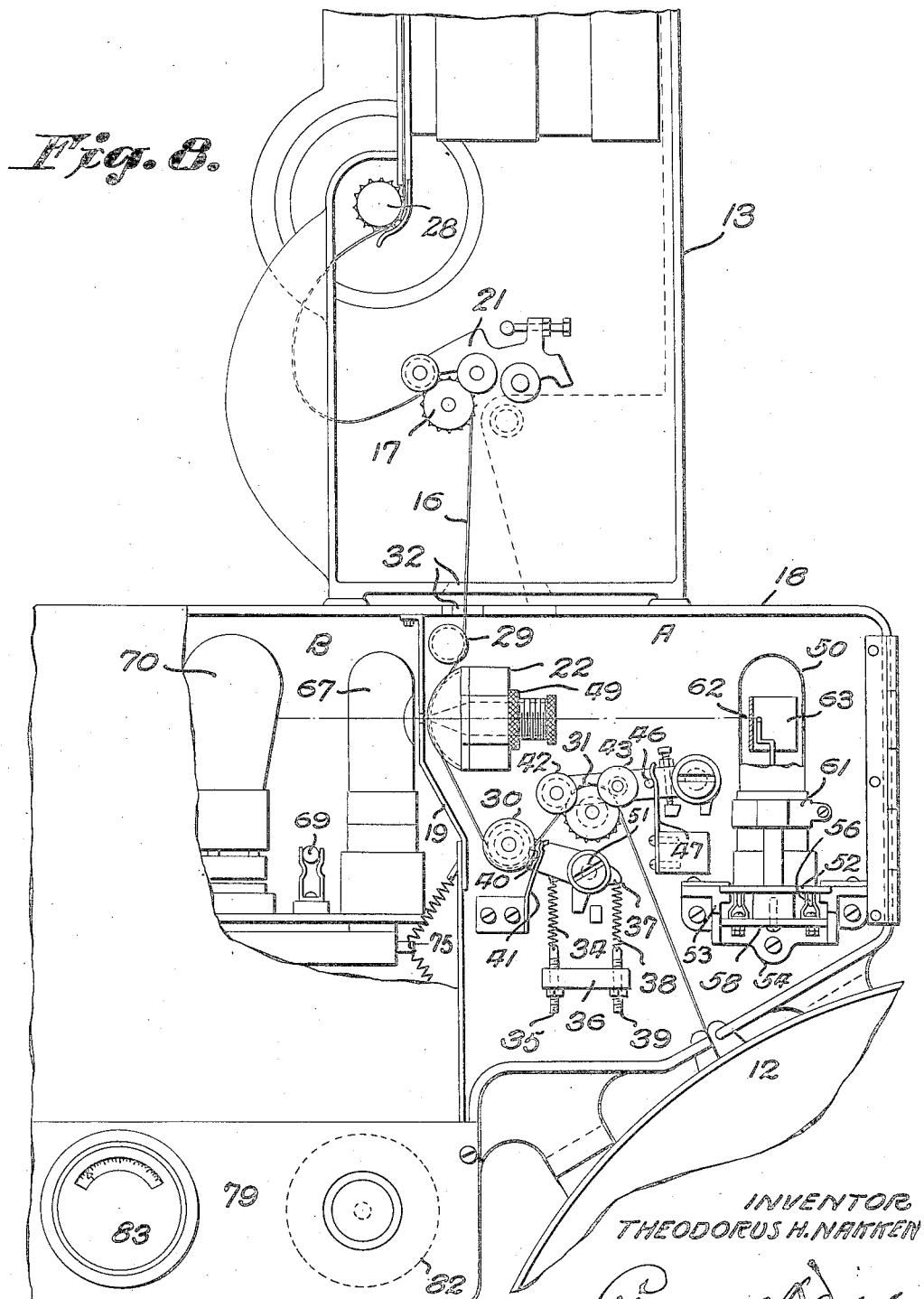
Figure 8 is an enlarged view in elevation of the sound head attachment as shown in Figure 2 in its relationship with the film hold back sprocket mechanism.

The projecting apparatus herein shown includes upper and lower reel compartments 11 and 12, respectively, and an intermediate compartment 13 adapted for the reception of the usual film operating mechanism. At the rear of the compartment 13 is the usual lamp housing 14 containing a suitable source of light for picture projecting purposes, the light rays from which passing through the hood 15 are directed through the film 16 as it is intermittently advanced.

Arranged as part of the motion picture apparatus and attached thereto adjacent the intermediate compartment 13, is a translating unit comprising certain instrumentalities, hereinafter more particularly described, which are adapted to function in association with a sound track, or sound record 16a on the film 16. The translating or reproducing of the recorded sound on the film is accomplished by imparting to it a continuous linear movement at a point beyond the usual film loop in the intermediate compartment 13 where the film moves intermittently or step-by-step through the path of the picture projecting light rays.

The translating unit or "sound head" includes a housing 18 having a generally vertically disposed partition 19, dividing it into compartments A and B, the divisional wall being provided with an aperture 20.

Within the compartment A and adjacent the aperture 20 is located an improved film support or guide 22, the front face of which is curved, or arcuate, and is provided with a pair of outwardly extending shoulders 23, which hold the film against lateral displacement. Preferably, the shoulders 23 are formed by recessing the face of the support so as to provide a pair of parallel ledges or ways 24 and 25 over which the sprocket-hole margins of the film pass. Between the guideways 24 and 25, the face of the guide is provided with a channel 26, the bottom of which has a curvature concentric with the curvature of the faces of the guideways 24 and 25 and the depth of which is such that the field areas of the film, as it travels over the ledges 24 and 25, are well out of contact with the bottom of such channel. In order that the sound track, as it passes over the film guide, may be subjected to light rays from a suitable source in the reproducing of sound, the guide is provided with an aperture 27 formed in the ledge 24 in a position to register with such sound track.

The film 16, in its passage from the intermediate compartment 13 through compartment A to the usual receiving reel located within the compartment 12 and not shown, passes over a guide roller 29 onto the ways 24 and 25 at a tangent to the curved film support and thereafter leaves the support at a like tangent, whereupon it passes under a tension guide roller 30 and around a continuously driven take-up sprocket 31 thence to the receiving reel. The tension roller 30 is carried by an arm 33, pivotally connected by a lag screw to a side wall of the housing 18, and is normally held in tensioning position, as shown, by a tension spring 34, one end of which is connected to the arm at one side of the pivotal point thereof and the other end to a vertically adjustable anchor 35 carried by an anchor plate 36 mounted on the side wall of the housing, the anchor 35 being vertically adjustable to enable the tensioning influence of the roller 30 upon the film 16 to be varied, as desired. The arm 33 is provided on the opposite side of its pivotal connection with an extension 37, to which is connected one end of a tension spring 38, the opposite extremity being connected to a vertically adjustable anchor 39 also carried by the anchor plate 36 and adapted to be moved vertically to various positions to correspondingly vary the influence of the spring 38 upon the arm 33. The springs 34 and 38 exert opposing forces or influences upon the arm 33 and may be adjusted independently of each other to establish various functional relations in delicately governing the influence of the tensioning roller 30 upon the film. Preferably, the arm 33 is provided with an outwardly projecting lug 40 which when the arm 33 is lifted, as when the film is being threaded through the machine, engages and moves over the upper curved end of a holding or detent spring 41 which is suitably connected to a wall of the housing 18 and which serves to temporarily support the arm in an elevated position against the influence of the spring 34. With the take-up sprocket 31 are associated pressure rollers 42 and 43, which engage the upper surface of the film 16 and serve to insure meshing of the sprocket teeth with the perforations formed in margins of the film. These rollers are carried in a parallel relation by an arm 44, which is pivoted to a side wall of the housing 18. The arm 44 is preferably provided with a pin 46 adapted to engage and move over the upper curved end of a retaining spring 47, which is carried on a side wall of the housing 18, whereby the arm may be temporarily held in an elevated position preparatory to threading the film over the sprocket 31 in conditioning the apparatus for use. The spring 47 cooperates with the pin 46 to hold the arm 48 in its lifted position on the one hand, and on the other hand to urge the rollers 42 and 43 into intimate engagement with the film 16 as it passes over the take-up sprocket.

At the rear of the film support 22 is located a suitable optical system 49, preferably of the two-lens type, which focuses the light beam from an exciter lamp or tube 50 upon the sound track 16a as it passes the aperture 27, thus defining the reproducing point. The sound track interrupts or causes variations in intensity of the transmitted light passing through the aperture 20 and falling on the light sensitive current varying element such as a photo-electric cell located in compartment B and hereinafter more particularly mentioned.

The exciter lamp or tube 50 is mounted upon a suitable support which includes a laterally adjustable platform 52, slidable upon a pair of guides 53, forming a part of a bracket 54 secured to and extending from one of the side walls of the housing 18. By reason of this construction a lateral movement of the support 52 will serve to correspondingly shift or change the position of the filament of the lamp 50. In this connection, it will be noted that the binding post terminals 55, to which a suitable source of current may be connected, are maintained in electrical connection with the filament terminals 56, during lateral adjustment of the support 52, by a plurality of spring contact fingers 57, connected to the binding posts and adapted to receive the filament terminals, the binding posts being connected to a plate 58 of insulating material secured to the underneath face of a horizontal rib 59 included in the bracket 54. Carried by the support 52, are a pair of posts 60, to the upper ends of which is connected a split clamp ring 61 adapted to receive the base of the exciter lamp 59. This clamp ring circumferentially engages the base of the exciter lamp but permits the exciter lamp to be adjusted to various positions of inclination with respect to its longitudinal axis for example, to position the slit 62 of the light guard 63 of the exciter lamp in a horizontal plane by tipping the lamp toward one side or the other of the housing 18, or to effect the bringing of the slit 62 and the longitudinal axis of the transverse lamp filament into the same horizontal plane by tilting the lamp either to the right or to the left, as viewed in Figure 2. These adjustments may be readily made while the clamp ring 61 frictionally engages the base of the exciter lamp, which ring serves thereafter, without necessarily tightening the same on the lamp base, to hold the lamp securely in its proper position.

Within the compartment B is arranged a translating unit 66, the function of which is to translate the variations in the sound track on the film 16, as the film passes over the guide 22, into corresponding electrical impulses which are utilized in reproducing the recorded sound by suitable instrumentalities such as a loud speaker (not shown). The translating unit includes a light-sensitive element, such as a photo-electric cell or tube 67, which is located in front of the aperture 20 so that the varying light rays cause the flow of photo-electric current to vary accordingly. The unit 66 further includes a plurality of amplifying tubes 70, by which the variable current produced by the photo-electric cell 67 is amplified to the desired extent.

The photo-electric cell 67 and the amplifying tube 70 are mounted on a base 71, supported on a plurality of rubber cushions 72, disposed transversely on a substantially rectangular frame 73. This frame is suspended by a plurality of tension springs 74, connected at their lower ends to a plurality of lugs 75, carried by the frame at the corners thereof, and connected at their upper ends to ears 76, struck from the upper ends of a pair of vertical arms 77, bent up from a horizontally disposed base member 78, carried at the upper end of a cover plate 79 for the lower end of the compartment B, the base member 78 serving as a support for certain electrical apparatus such as a transformer 80, a plurality of condensers 81 and the cover plate 79 serving as a support for certain other electrical instrumentalities such as a rheostat 82 and an ammeter 83. Also connected to the lugs 75, are a plurality of tension springs 85 which are secured at their lower ends to a plurality of ears 86, also struck from the vertical arms 77. By reason of this arrangement of the springs 74 and 85, it will be understood that the frame 73, together with the electrical instrumentalities carried thereby, is tensioned against undue upward and downward displacement, and that these springs serve to retain such frame normally in a given horizontal plane. It will also be understood, since the springs 74 and 85 are inclined outwardly from their points of connection with the frame 73, that the unit 66 is held normally against lateral displacement. Although the unit 66 is normally held against both vertical and lateral movement, it is so suspended in a floating or yieldable manner that relative universal movement between it and the housing may be effected, with the result that it is protected against vibrations incident to the operation of the projecting apparatus which would permit microphonic disturbances in the tubes and thereby impair the fidelity of sound reproduction.

The arms 77 are preferably of sheet metal as shown, integral with a base plate portion as indicated, which base plate is mounted within the case member 18 in any convenient way, as by brackets or studs, or preferably by a downwardly bent plate at the rear resting upon the bottom of the main case 18. To the member 77 is attached, as previously described, the floating frame 73, and also the auxiliary circuit members such as the transformer 80 and the condensers 81, and also the rheostat 82 and ammeter 83. As shown, the sub-assembly on the sub-frame 77 is protected by the plate 79, which in turn is adapted to be held in place by the screws indicated. Appropriate terminals for connection are provided in the usual way, although they are not shown in the drawings. This sub-assembly may be removably hinged at the bottom, and is thus adapted to ready removal by opening the upper door, and taking out the screws holding the plate 79. This sub-assembly containing the photocell, the amplifier tubes, and the auxiliary circuit members may then be removed as a whole, and replaced by another similar member, this feature is of particular convenience in maintenance of the system, since it thereby is conveniently possible to provide a complete spare member, which may be substituted for a defective member with a minimum expenditure of time and labor.

By the system of this invention there is thus produced a new and useful film guide adapted to eliminate scratching, to improve the accuracy of reproduction, and to simplify the construction. In addition the invention provides a new suspension system for the sound transferring electrical units, which is particularly adapted to convenient, simple, and easy removal for servicing and replacement. In addition, the invention provides a new and useful film tensioning and driving system as well as a new and useful exciter light support.

Although only one form of the invention is herein shown and described, it will be understood that various changes may be made without departing from the spirit of the following claims.

What is claimed is:

1. In an apparatus for reproducing a sound record on a film, the combination with means for moving a film continuously, of a curved surface, means for holding the film under substantially uniform tension in contact therewith to conform to the curvature of the said curved surface, and means for creating current variations in an electric circuit corresponding to said recorded variations as they pass a given point on said curved surface.

2. In an apparatus for reproducing a sound record recorded on a photographic film, the combination with means for moving a film continuously, of a guide for the film having a curved face, means cooperating with said means for moving for tensing said films substantially uniformly against said curved face to hold the film in an arcuate position, said guide having an aperture in a curved face in alignment with the sound record, a source of light, a focusing lens system therefor having its axis in alignment with said aperture and at the rear side of said curved surface and a light sensitive current varying element positioned in front of the curved surface.

3. In an apparatus for reproducing sound from the sound track of a film, a film guide having an opening for the sound light and a pair of spaced curved surfaces onto and over which the film is curved and adapted to travel, said surfaces being at the locality of said opening and being so related to each other that they are adapted to engage only the margins of the film, the area of the guide intermediate said surfaces being relieved to provide a substantial clearance between the surface of such intermediate area and the sound record and picture area of the film intermediate the sprocket hole margins thereof as such film is moved over said surfaces.

4. In an apparatus for reproducing sound from the sound track of a film, a curved film guide having an aperture therein adapted to register with the sound track of the film as it moves over the guide, with the film curved at said aperture, an optical system associated with said guide, a source of light adapted to supply light rays to said sound track through said optical system, and means for adjusting said source of light with respect to the axis of said optical system and for retaining it in the desired position of adjustment, and comprising a lateral movable platform and a clamp ring, the latter embracing said source of light.

5. In an apparatus for reproducing sound from the sound track of a film, a film guide having an aperture therein adapted to register with the sound track of the film as it moves over the guide, an optical system associated with said guide, a source of light adapted to supply light rays to said sound track through said optical system, a translating unit adapted to function in reproducing the recorded sound of the film, and means yieldably supporting said unit and functioning to suppress transmittal thereto of vibrations originating exteriorly thereof.

6. In an apparatus for reproducing a sound record on film, an exciter lamp, a support therefor, and an adjustable positioning means therebetween comprising pillar members, and a ring member slidable thereon adapted to encircle the exciter lamp structure.

7. In an apparatus for reproducing sound from a film record, means defining a reproducing point, means for drawing a record carrying film past said point, and tensioning means therebetween comprising a roller member cooperating with said film, an arm member carrying said roller member, a pivot for said arm member and control means for said arm comprising a pair of similar, oppositely acting springs.

8. In an apparatus for reproducing sound from a film record, means defining a reproducing point, means for drawing a record carrying film past said point, and tensioning means therebetween comprising a roller member cooperating with said film, an arm member carrying said roller member, a pivot for said arm member and control means for said arm comprising spring members attached to said arm upon opposite sides of said pivot.

9. In an apparatus for reproducing a sound record on film, a combination of means for defining a reproducing point, means for traversing a film record past said point and a sensitive means cooperating therewith comprising a removable container, a photo-cell mounted therein, and amplifying means also mounted therein and cooperating therewith, said container comprising a supporting member damped against vibrations carrying said amplifier members.

10. In an apparatus for reproducing a sound record on film, a combination of means for defining a reproducing point, means for traversing a film record past said point and a sensitive means cooperating therewith comprising in combination a photo-cell, an amplifier system, and a cushioning support therefor.

11. In an apparatus for reproducing a sound record on film, a combination of means for defining a reproducing point, means for traversing a film record past said point and a sensitive means cooperating therewith comprising a removable support member having therein amplifier coupling members, a cushioned mount, and amplifier tubes and a photo-cell thereon, said container and contents being removable as a unit.

12. In apparatus for reproducing a sound record on film, a combination of means for defining a reproducing point; means for traversing a film record past said point; a bodily removable carriage; and a photocell and amplifier system wired in combination and mounted on said carriage for removal and replacement as an entirety.

13. In an apparatus for reproducing a sound record on film, a combination of means for defining a reproducing point; means for traversing a film record past said point; a bodily removable carriage; a completely wired amplifier system including an electrically responsive light sensitive device mounted on said carriage for removal and replacement therewith as a unit.

14. In an apparatus for reproducing a sound record on film, the combination of means for defining a reproducing point, means for traversing a film record past said point, means responsive to said record at said point, and a gate member comprising a lens unit and a film bending portion as a unit at said reproducing point, said gate member being removable and replaceable as a unit.

15. In an apparatus for reproducing a sound record on film, the combination of means for defining a reproducing point, means for traversing a film record past said point, means responsive to said record at said point, and a removable gate member at said reproducing point, having a substantial height and unitarily comprising a lens system, and a light source focussed at said reproducing point, and adapted to adjustment to position an image thereof within the opening in said sound gate.

16. The method of reproducing a sound record from a photographic film which comprises progressing the photographic film across the elements of a stationary member having at least in part a cylindrical guiding surface near the optical axis of the light system and subjecting said film meanwhile to substantially uniform lengthwise tension tending to hold the same against said cylindrical surface.

17. The method of reproducing sound from a photographic film record which comprises progressing and substantially uniform tensing the film about a stationary member near the axis of the optical system into substantially cylindrical form near said axis of the optical system.

18. In a sound record system, means for traversing a film having a sound record thereon and means for converting said record into electrical vibrations, comprising a removable carriage, a photocell and amplifier assembly mounted on said carriage and removable therewith.

19. In a sound record system, a main frame; a freely removable carriage mounted in said main frame; a photocell and amplifier apparatus mounted on said carriage to be removable therewith from said main frame.

20. In sound reproducing apparatus, a frame; means fixed to said frame for guiding and moving a combined picture and sound record bearing film intermittently at one locality and at uniform speed at a second locality and for limiting said film to defined localities in said frame during its movement; a removable carriage; a light sensitive electrically responsive device and an amplifier system both electrically combined and mounted on said carriage; and carriage releasable mountings fixed to said frame for removably holding said carriage clear of interference with said film but with said light sensitive device in predetermined cooperative relation with said film at the locality of its uniform speed.

THEODORUS H. NAKKEN.

CERTIFICATE OF CORRECTION.

Patent No. 2,039,182.   April 28, 1936.

THEODORUS H. NAKKEN.

It is hereby certified that error appears in the printed specification of the above numbered patent requiring correction as follows: Page 4, first column, line 19, claim 2, for the word "films" read film; and second column, line 28, claim 9, after "vibrations" insert a comma; page 5, first column, line 17, claim 17, for "uniform" read uniformly; and that the said Letters Patent should be read with these corrections therein that the same may conform to the record of the case in the Patent Office.

Signed and sealed this 4th day of August, A. D. 1936.

Henry Van Arsdale (Seal)   Acting Commissioner of Patents.